US008855023B2

(12) United States Patent
Mutikainen et al.

(10) Patent No.: US 8,855,023 B2
(45) Date of Patent: Oct. 7, 2014

(54) METHOD FOR SRVCC EMERGENCY CALL SUPPORT

(75) Inventors: Jari Mutikainen, Lepsama (FI); Markku Ahti Tuohino, Espoo (FI)

(73) Assignee: Nokia Corporation, Espoo (FI)

( * ) Notice: Subject to any disclaimer, the term of this patent is extended or adjusted under 35 U.S.C. 154(b) by 308 days.

(21) Appl. No.: 13/129,772

(22) PCT Filed: Nov. 16, 2009

(86) PCT No.: PCT/IB2009/007475
§ 371 (c)(1),
(2), (4) Date: May 17, 2011

(87) PCT Pub. No.: WO2010/055410
PCT Pub. Date: May 20, 2010

(65) Prior Publication Data
US 2011/0228707 A1    Sep. 22, 2011

Related U.S. Application Data

(60) Provisional application No. 61/193,318, filed on Nov. 17, 2008.

(51) Int. Cl.
| | |
|---|---|
| H04W 4/00 | (2009.01) |
| H04L 12/16 | (2006.01) |
| H04L 12/66 | (2006.01) |
| H04M 11/04 | (2006.01) |
| H04W 36/00 | (2009.01) |
| H04W 8/04 | (2009.01) |
| H04W 76/00 | (2009.01) |
| H04W 4/22 | (2009.01) |

(52) U.S. Cl.
CPC .............. *H04W 8/04* (2013.01); *H04W 76/007* (2013.01); *H04W 36/0022* (2013.01); *H04W 4/22* (2013.01)

USPC ........ 370/259; 370/331; 370/352; 455/404.1; 455/436; 379/45

(58) Field of Classification Search
None
See application file for complete search history.

(56) References Cited

U.S. PATENT DOCUMENTS 6,233,445 B1 *  5/2001  Boltz et al. ................. 455/404.2
6,731,609 B1 *  5/2004  Hirni et al. ..................... 370/260

(Continued)

FOREIGN PATENT DOCUMENTS

WO     2007/072462 A2     6/2007

OTHER PUBLICATIONS

International Search Report and Written Opinion received for corresponding Patent Cooperation Treaty Application No. PCT/IB2009/007475, dated Mar. 26, 2010, 17 pages.

(Continued)

*Primary Examiner* — Hassan Phillips
*Assistant Examiner* — Hicham Foud
(74) *Attorney, Agent, or Firm* — Mintz, Levin, Cohn, Ferris, Glovsky & Popeo, P.C.

(57) ABSTRACT

Methods and apparatus, including computer program products, are provided for emergency call support. In one aspect there is provided a method. The method may include a home subscriber server receiving a first message comprising a generated value representing a session transfer number. The session transfer number may relate to a transfer of an emergency session from a first network to a second network. The method may further comprise a home subscriber server updating a user profile with the generated value representing the session transfer number for the emergency session. The user profile may be stored in the home subscriber server. The method may further comprise a home subscriber server sending a second message comprising the generated value representing the session transfer number. Related apparatus, systems, methods, and articles are also described.

20 Claims, 8 Drawing Sheets

(56) References Cited

U.S. PATENT DOCUMENTS

| | | | |
|---|---|---|---|
| 7,496,182 B2* | 2/2009 | Coster et al. | 379/45 |
| 7,672,680 B1* | 3/2010 | Lee et al. | 455/456.5 |
| 8,335,485 B2* | 12/2012 | Tuohino et al. | 455/404.2 |
| 8,340,627 B2* | 12/2012 | Edge | 455/404.1 |
| 8,385,881 B2* | 2/2013 | Zhu et al. | 455/404.1 |
| 8,412,230 B2* | 4/2013 | Nylander et al. | 455/456.1 |
| 2007/0254625 A1 | 11/2007 | Edge | |
| 2009/0003312 A1* | 1/2009 | Velazquez et al. | 370/352 |
| 2009/0141870 A1* | 6/2009 | Coster et al. | 379/45 |
| 2010/0124897 A1* | 5/2010 | Edge | 455/404.1 |
| 2011/0141979 A1* | 6/2011 | Keller et al. | 370/328 |

OTHER PUBLICATIONS

"3rd Generation Partnership Project; Technical Specification Group Services and System Aspects; Single Radio Voice Call Continuity (SRVCC); Stage 2 (Release 8)", 3GPP TS 23.216, v8.1.0, Sep. 2008, pp. 1-29.

"SRVCC Functionality for Emergency Calls", 3GPP TSG-SA WG2 Meeting #72, S2-092504, 23.216 CR 0072, v8.3.0, Mar. 30-Apr. 3, 2009, 23 pages.

"3rd Generation Partnership Project; Technical Specification Group Services and System Aspects; Feasibility Study on Voice Call Continuity Support for Emergency Calls (Release 8)", 3GPP TR 23.826, v0.6.0, Oct. 2010, pp. 1-67.

"3rd Generation Partnership Project; Technical Specification Group Services and System Aspects; SR VCC Support for IMS Emergency Calls (Release 9)", 3GPP TR 23.870, v0.1.0, Nov. 2008, pp. 1-12.

"3rd Generation Partnership Project; Technical Specification Group Services and Architecture; IP Multimedia Subsystem (IMS) Service Continuity; Stage 2 (Release 8)", 3GPP TS 23.237, v8.0.0, Jun. 2008, pp. 1-40.

* cited by examiner

METHOD FOR SRVCC EMERGENCY CALL SUPPORT

RELATED APPLICATION

This application was originally filed as PCT Application No. PCT/IB2009/007475, filed Nov. 16, 2009, which claims priority benefit from U.S. Provisional Application No. 61/1193,318, filed Nov. 17, 2008.

TECHNICAL FIELD

The present invention relates generally to communication networks. More specifically, the present invention relates to apparatuses, systems, and methods for supporting emergency sessions in communication networks.

BACKGROUND

Currently developed telecommunication technologies provide solutions for performing a handover (HO) operation from a Long Term Evolution (LTE) or High Speed Packet Access (HSPA) system to a second generation or third generation mobile network (2G/3G) under normal conditions. Such an operation often involves a handover from a Voice over Internet Protocol (VoIP) sessions using Internet Protocol Multimedia Subsystems (IMS) to a circuit switched domain, and is sometimes referred to as a single radio voice call continuity (SRVCC) operation.

In currently available SRVCC operations, a handover typically involves a mobile switching center (MSC) executing a domain transfer using a session transfer number (STN-SR). The STN-SR may be a unique number or value (such as an E.164 address) that is stored in a Home Subscriber Server (HSS) of a user. The STN-SR routes to a Service Centralization and Continuity Application Server (SCC AS) of the home network. Although telecommunication technologies provide for such handover operations under normal conditions, currently available technologies fail to provide adequate solutions for such a handover during an emergency session.

These deficiencies are due, at least in part, to the fact that the STN-SR routes to an SCC AS in the home network, whereas emergency calls or sessions are assumed to be in visited networks. Additionally, Dual-Radio Voice Call Continuity (Dual-Radio VCC) technology fails to provide a viable solution. In Dual-Radio VCC, the SCC AS returns a dynamic STN to the UE in session initiation protocol (SIP) signaling when the emergency call is established. The UE then uses the dynamic STN to execute a domain transfer. However, this solution cannot be used in an emergency SRVCC scenario because an SRVCC handover and domain transfer is triggered by the visited network, which is not aware of the dynamic STN. Accordingly, currently available telecommunication technologies fail to provide support for SRVCC emergency calls or sessions.

SUMMARY

Method and apparatus, including a computer program product, are provided for SRVCC emergency call support.

In one aspect there is provided a method. The method may include a home subscriber server receiving a first message comprising a generated value representing a session transfer number. The session transfer number may relate to a transfer of an emergency session from a first network to a second network. The method may further comprise a home subscriber server updating a user profile with the generated value representing the session transfer number for the emergency session. The user profile may be stored in the home subscriber server. The method may further comprise a home subscriber server sending a second message comprising the generated value representing the session transfer number.

In another aspect there is provided an apparatus. The apparatus may include at least one processor and at least one memory configured to receive a first message comprising a generated value representing a session transfer number. The session transfer number may relate to a transfer of an emergency session from a first network to a second network. The at least one processor and the at least one memory may also be configured to provide updating a user profile with the generated value representing the session transfer number for the emergency session. The user profile may be stored in the home subscriber server. The at least one processor and the at least one memory may also be configured to provide sending a second message comprising the generated value representing the session transfer number.

In another aspect there is provided a computer-readable storage medium including code which when executed on at least one processor provides receiving a first message comprising a generated value representing a session transfer number. The session transfer number may relate to a transfer of an emergency session from a first network to a second network. The at least one processor may further provide updating a user profile with the generated value representing the session transfer number for the emergency session. The user profile may be stored in the home subscriber server. The at least one processor may further provide sending a second message comprising the generated value representing the session transfer number.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
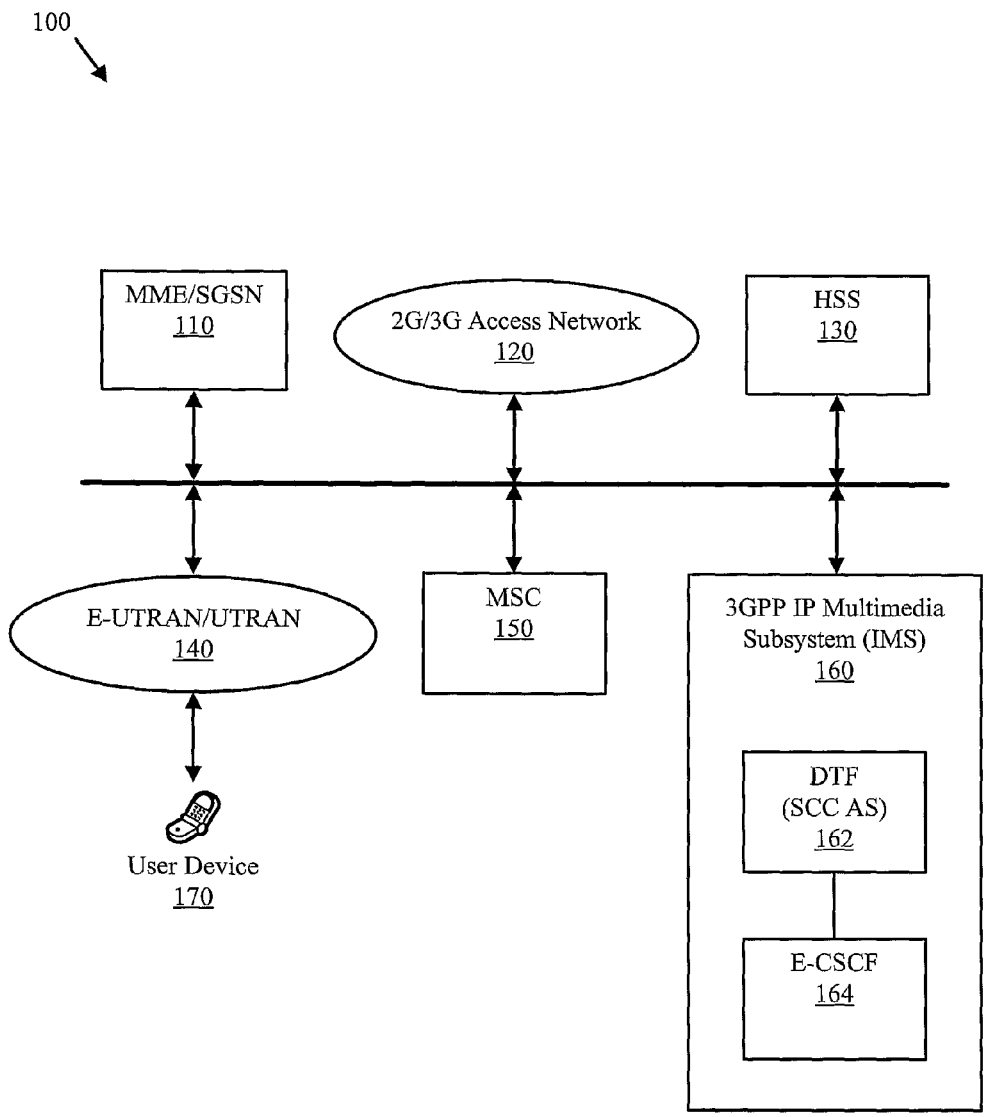
FIG. 1 depicts a block diagram of an emergency call support system in accordance with embodiments of the present invention.

Like labels are used to refer to same or similar items in the drawings.

DETAILED DESCRIPTION

FIG. 1 is a block diagram of an SRVCC emergency call support system 100. The depicted system 100 includes a mobility management entity (MME/SGSN) 110, a 2nd Generation or 3rd Generation (2G/3G) access network 120, a home subscriber server (HSS) 130, Evolved Universal Terrestrial Radio Access Network (E-UTRAN) 140, single radio voice call continuity mobile switching center (SRVCC MSC) 150, 3rd Generation Partnership Program (3GPP) Internet Protocol Multimedia Subsystem (IMS) 160, and user device 170. The components of the system 100 cooperate to enable support for a Single Radio Voice Call Continuity (SRVCC) emergency call in accordance with some embodiments of the present invention.

In some embodiments, the user device 170 initiates a registration process for an emergency session with the E-UTRAN 140. The emergency session may be a Voice over IP (VoIP) IMS session. In some embodiments, during the registration process of the emergency session, the 3GPP IMS 160 may be configured to communicate data related to a Session Transfer Number for SRVCC (STN-SR) of the emergency session to the HSS 130. Additionally, an Emergency CSCF (E-CSCF) or an S-CSCF may be used during the emergency session set-up to provide the STN-SR data to the HSS 130. Accordingly, the system 100 may provide a solution for generating STN-SR data of an emergency session in a visited network 140 and communicating the STN-SR to an HSS 130.

In some embodiments, the HSS 130 may be configured to receive the STN-SR data sent by the 3GPP IMS 160 and to communicate the STN-SR data to the MME 110. In some embodiments, the MME 110 may be configured use the STN-SR data to update a locally stored HSS user profile corresponding to the user device 170, which will later enable the MME 110 to obtain an Emergency STN-SR (E-STN-SR) for an emergency SRVCC procedure.

An emergency SRVCC procedure may include a scenario where a handover (HO) from the E-UTRAN 140 to a circuit switched network such as 2G/3G Access Network 120 is desirable. In such a scenario, the E-UTRAN 140 may initiate an SRVCC procedure, which may include performing or executing operations found in Release 8 of 3GPP TS 23.216 (herein incorporated by reference). In some embodiments, this may include the E-UTRAN 140 communicating within the MME 110 to indicate a need to perform a single radio voice call continuity (SRVCC) operation.

In response, the MME or Serving GPRS Support Node (SGSN) 110 may use a "Sv" interface to provide the MSC 150 with an Emergency Session Transfer Number for SRVCC (E-STN-SR) to facilitate performance of the SRVCC operation. In some embodiments, the E-STN-SR is a non-unique number or value, as opposed to a unique value that is often used in an SRVCC operation under normal or non-emergency scenarios. The E-STN-SR may be configured to point to a local IMS network that handles the IMS emergency session.

Upon obtaining the E-STN-SR, the MSC 150 (or MSC enhanced with SRVCC) may use the E-STN-SR to enable an SRVCC operation or "session continuity" operation by communicating with the 3GPP IMS 160 as defined in Release 8 of 3GPP TS 23.216. As a result, when the local IMS receives the INVITE with E-STN-SR, the local IMS may perform a domain transfer using a Domain Transfer Function 162 (DTF or SCC AS) and an Emergency Call Session Control Function (E-CSCF) 164, which may include procedures similar to those defined in 3GPP TR 23.826 (section 6.1.4.2) for Dual Radio VCC. Additionally, the MSC 150 may initiate a handover procedure with the target network as defined in 3GPP TS 23.216.

Additional operations or procedures may also be performed by the system 100 to complete the emergency SRVCC operation. Such procedures may include those defined by 3GPP TS 23.216, where a handover command (CMD) is sent to the user device 160, and the user device 160 switches over to the 2G/3G Access Network 120. Accordingly, the system 100 may provide a solution for supporting SRVCC procedures during an emergency call by providing the MME 110 with the appropriate STN-SR data.

It should be appreciated that a system, in accordance with some embodiments of the present invention, may include terminals, nodes and networks in addition to the components depicted in the system 100 of FIG. 1. The emergency session may include an IMS emergency session in a visited network 160. Additionally, the E-UTRAN network 140 may include a Long Term Evolution (LTE) and High Speed Packet Access (HSPA) network. Additionally, a visited IMS network may be used for routing a session to a Public Safety Answering Point (PSAP), and a Session Initiation Protocol (SIP) may be anchored by a Domain Transfer Function (DTF) server 162 or a Service Centralization and Continuity Application Server (SCC AS) 162 similar to those presented in Release 8 of 3GPP TR 23.826.

Figure 2:
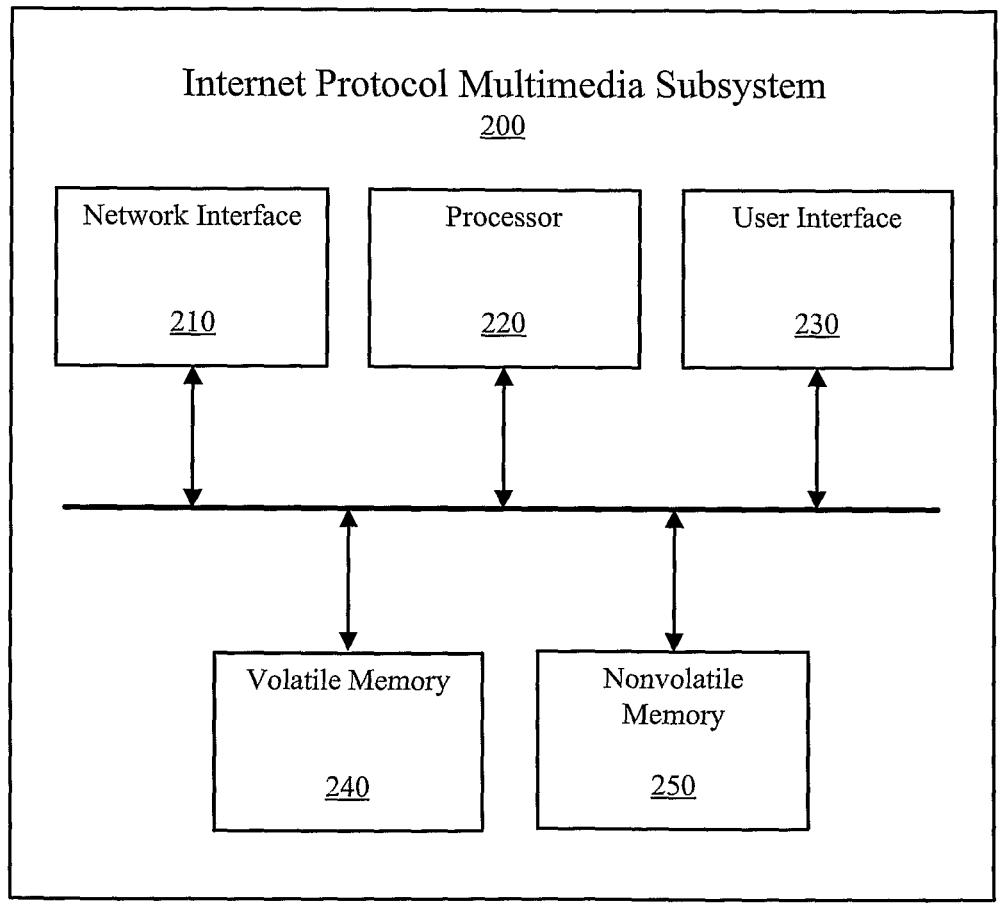
FIG. 2 depicts a block diagram of an Internet Protocol (IP) Multimedia Subsystem (IMS) in accordance with embodiments of the present invention.

FIG. 2 is a block diagram of an Internet Protocol Multimedia Subsystem (IMS) 200. The depicted IMS 200 includes a network interface 210, a processor 220, a user interface 230, a volatile memory 240, and a nonvolatile memory 250. In some embodiments, the IMS 200 of FIG. 2 corresponds to the IMS 160 of FIG. 1. In some embodiments, the components of the IMS 200 cooperate to provide an HSS with STN-SR data.

In some embodiments, the network interface 210 is configured to enable communication between the IMS 200 and other network devices. In some embodiments, such network devices may include those represented by FIG. 1, such as a device of the MME/SGSN 110, HSS 130, E-UTRAN 140, and the MSC 150. The network interface 210 may include one or more hardware components operating in accordance with one or more protocols or software instructions.

In some embodiments, the processor 220 may be configured to generate STN-SR data in response to a user device initiating an emergency session registration process with a visited network. In some embodiments, the STN-SR data may be derived by the processor 220 from STN-RN information or related information in the visited network. In some embodiments, the STN-SR data may be based on P-Visited Network information. Accordingly, the processor 220 of the IMS 200 may operate to generate STN-SR data during an emergency session registration process initiated by a user device.

The processor 220 may also be configured to communicate the STN-SR data to an HSS of the user device. In some embodiments, this communication of data may be facilitated or performed by a Serving Call Session Control Function (S-CSCF). The STN-SR data may be communicated to the HSS 130 by including the STN-SR data in a 3GPP-specific Extensible Markup Language (XML) payload, a 3GPP-specific XML payload request, a new Session Initiation Protocol (SIP) header, or the like. In some embodiments, a Proxy CSCF (P-CSCF) may function to add the information within the emergency registration via Policy and Charging Control (PCC) mechanisms. In this manner, the processor 220 of the IMS 200 may operate to communicate STN-SR data from a visited network to a home network.

In some embodiments, the user interface 230 may include a combination of hardware and software that facilitates communication between the IMS 200. For example, a user interface 230 may include one or more speakers, one or more user-pressable buttons, one or more key pads, one or more digital screens and/or touch screens, one or more lights, or any other feature that would facilitate bidirectional communication with a user. Accordingly, the user interface 230 may facilitate an interaction between a user and the IMS 200.

In some embodiments, the volatile memory 240 may include any variety of volatile storage mediums. For example, the volatile memory device 240 may include a volatile storage component, a primary storage component, a random access memory (RAM) component, and/or a dynamic random access memory (DRAM) component such as a double data rate synchronous dynamic access memory (DDR SDRAM) component.

In some embodiments, the nonvolatile memory device 250 may include a variety of nonvolatile storage mediums such as digital devices that retain data when a power supply is disconnected. For example, the nonvolatile memory device 250 may include any variety of read-only memory (ROM) components. Additionally, the nonvolatile memory device 250 may include optical memory components such as an optical disk, a paper tape, or a punch card.

Figure 3:
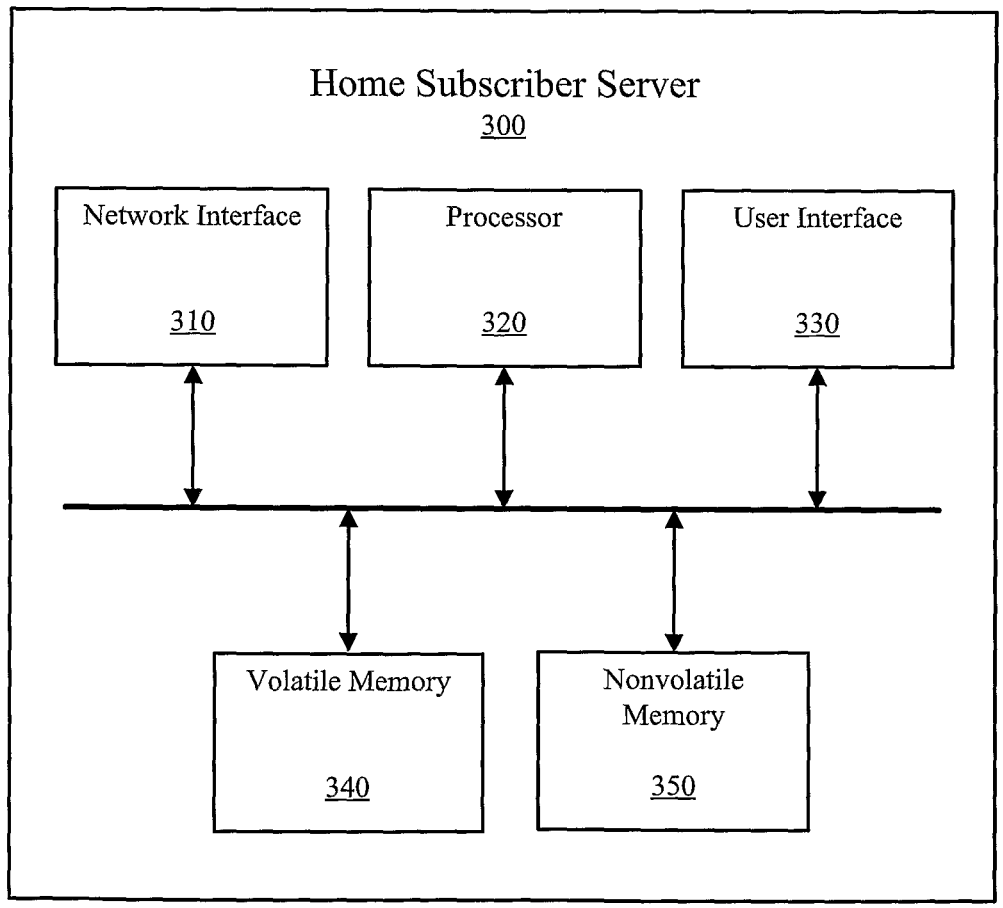
FIG. 3 depicts a block diagram of a Home Subscriber Server (HSS) in accordance with embodiments of the present invention.

FIG. 3 is a block diagram of a home subscriber server (HSS) 300. The depicted HSS 300 includes a network interface 310, a processor 320, a user interface 330, a volatile memory 340, and a nonvolatile memory 350. In some embodiments, the HSS 300 of FIG. 3 corresponds to the HSS 130 of FIG. 1. In some embodiments, the components of the HSS 300 cooperate to receive STN-RN data from an IMS and update an HSS user profile stored on an MME.

In some embodiments, the network interface 310 is configured to enable communication between the HSS 300 and other network devices. In some embodiments, such network devices may include those represented by FIG. 1, such as a device of the MME/SGSN 110 and the IMS 160. The network interface 310 may include one or more hardware components operating in accordance with one or more protocols or software instructions.

In some embodiments, the processor 320 may be configured to receive STN-SR data corresponding to an emergency session at a visited network. In some embodiments, processor 320 may be configured to update a locally stored HSS user profile based on the STN-SR data. In some embodiments, the processor 320 may communicate instructions and/or the STN-SR data to the MME using a user profile management function configured to update an HSS user profile stored in the MME. Additionally, the processor 320 may perform this by using a Diameter command such as an Insert HSS User Profile command or procedure.

In some embodiments, the processor 320 is configured to update an HSS user profile stored in the MME in response to receiving the STN-SR data from the IMS, which may be during the emergency session registration process initiated by the user device. Consequently, in at least some embodiments, the STN-SR data may already be a part of the "Subscription-Data" Attribute Value Pair (AVP) when the MME is updated with the HSS user profile. Additionally, when the time comes for the MME to initiate an SRVCC for the emergency session, the MME will have the appropriate emergency STN-SR (E-STN-SR). Accordingly, the processor 320 of the HSS 300 may receive STN-SR data, update a locally stored HSS user profile, and transmit data and instructions for an MME to do so as well.

In some embodiments, the user interface 330, the volatile memory 340, and the nonvolatile memory 350 may include a variety of devices similar to those described above with respect to the IMS 200 of FIG. 2.

Figure 4:
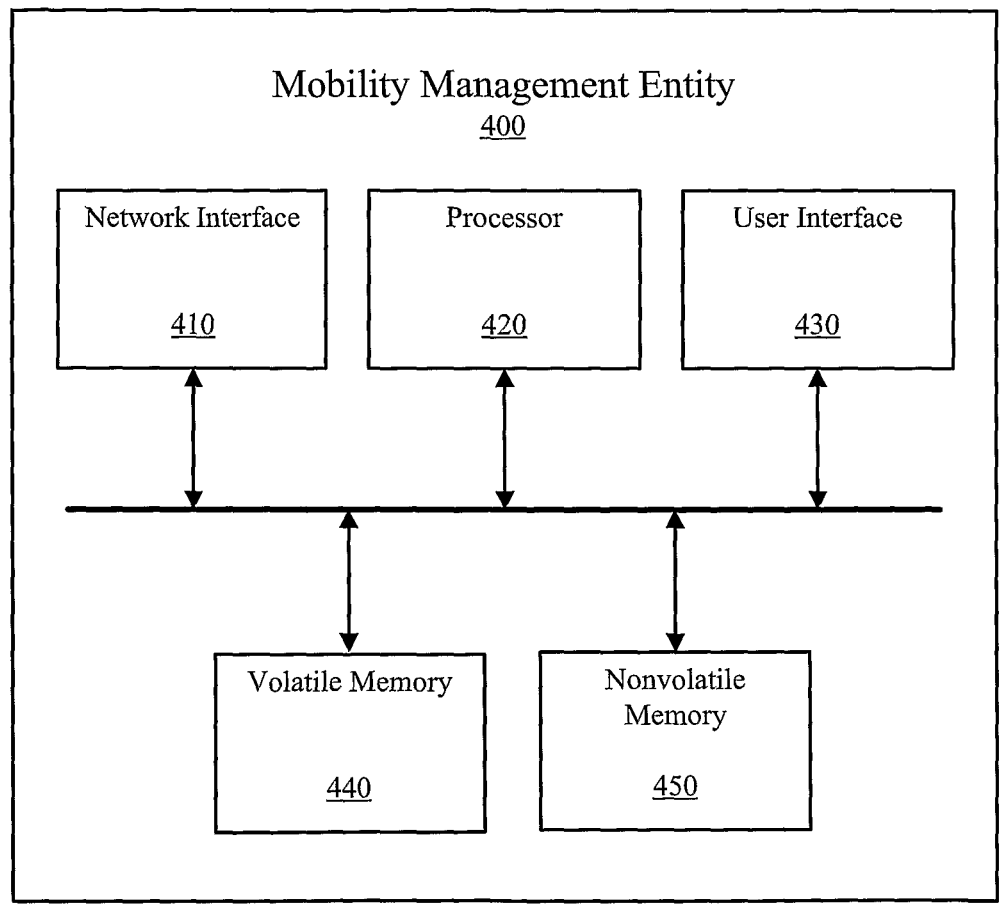
FIG. 4 depicts a block diagram of a Mobility Management Entity (MME) in accordance with embodiments of the present invention.

FIG. 4 is a block diagram of a mobile management entity (MME) 400. The depicted MME 400 includes a network interface 410, a processor 420, a user interface 430, a volatile memory 440, and a nonvolatile memory 450. In some embodiments, the MME 400 of FIG. 4 corresponds to the MME 110 of FIG. 1. In some embodiments, the components of the MME 400 cooperate to receive STN-RN data from an HSS and initiate an emergency SRVCC operation.

In some embodiments, the network interface 410 is configured to enable communication between the MME 400 and other network devices. In some embodiments, such network devices may include those represented by FIG. 1, such as a device of the HSS 130 and the MSC 150. The network interface 410 may include one or more hardware components operating in accordance with one or more protocols or software instructions.

In some embodiments, the processor 420 may be configured to receive STN-SR data from an HSS. In some embodiments, the processor 420 is configured to receive one or more instructions for updating an HSS user profile that is stored locally on the MME 400. In some embodiments, the processor 320 is configured to update a user profile based on the instructions and STN-SR data received from the HSS. The user profile may correspond to a user device that attempts to establish or that has established an emergency session in a visited network.

The processor 420 may be configured to receive an indication for an emergency SRVCC event from an LTE network. In response thereto, the processor 420 may be configured to initiate an emergency SRVCC event by providing an MSC with an E-STN-SR corresponding the user device of the emergency session. In some embodiments, an E-STN-SR is an updated STN-SR that corresponds to an emergency session of the user device in question.

In some embodiments, the user interface 430, the volatile memory 440, and the nonvolatile memory 450 may include a variety of devices similar to those described above with respect to the IMS 200 of FIG. 2.

In some embodiments, the nonvolatile memory device 450 may include a variety of nonvolatile storage mediums such as digital devices that retain data when a power supply is disconnected. For example, the nonvolatile memory device 450 may include any variety of read-only memory (ROM) components. Additionally, the nonvolatile memory device 450 may include optical memory components such as an optical disk, a paper tape, or a punch card.

It should be noted that a processor, as used herein, may be implemented as a hardware circuit comprising custom VLSI circuits or gate arrays, off-the-shelf semiconductors such as logic chips, transistors, or other discrete components. A processor may also be implemented in programmable hardware devices such as field programmable gate arrays, programmable array logic, programmable logic devices, or the like. A processor may also be implemented as a single processing device or as several processing devices configured to perform a given operation or task.

Additionally, a computer program embodied on a computer-readable storage medium, a compute-readable medium encoded with a computer program, or similar language may be embodied as a tangible data storage device storing computer software programs configured to control a processor, digital processing device, central processing unit (CPU), or the like, to perform one or more operations or execute one or more software instructions. A tangible data storage device may be embodied as a volatile memory device or a nonvolatile memory device, and/or a combination of a volatile memory device and a nonvolatile memory device. Accordingly, the subject matter disclosed herein may provide for a computer-readable medium encoded with a computer program, where the computer program is configured to perform operations.

Figure 5:
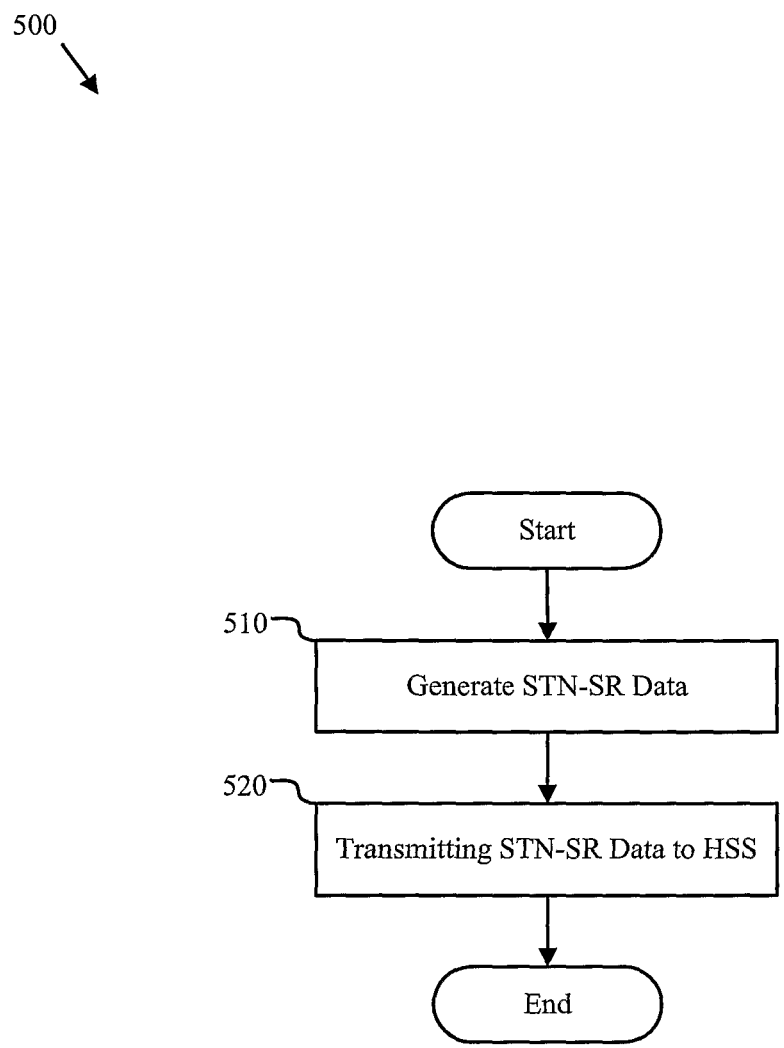
FIG. 5 depicts a flow chart diagram of a method for an IMS to generate STN-SR data in accordance with embodiments of the present invention.

FIG. 5 is a flow chart diagram of a method 500 for a mobility management entity to initiate an emergency session continuity procedure. The depicted method 500 includes generating STN-SR data, and transmitting 520 STN-data. The operations of the method 500 provide a solution for providing an HSS with STN-SR data that corresponds to an emergency session in a visited network.

In some embodiments, generating 510 STN-SR data may include an IMS or an emergency session producing data corresponding to a user device and an emergency session. In some embodiments, the STN-SR data may be derived from STN-RN information or related information in a visited network. In some embodiments, the STN-SR data may be based on P-Visited Network information.

Generating 510 STN-SR data may comprising producing a number that is locally configured in a visited network and used to point to a local IMS network that handles a pending IMS emergency. The STN-SR data may not be unique per subscriber. Indeed, in some embodiments, one common E-STN-SR for all subscribers may be sufficient. Transmitting 520 the STN-SR data to an HSS may include an IMS transmitting an STN-SR that is generated in a visited network and corresponds to a user profile of the HSS. Accordingly, the method 500 may provide a solution for generating STN-SR data and transmitting the STN-SR data to an HSS.

Figure 6:
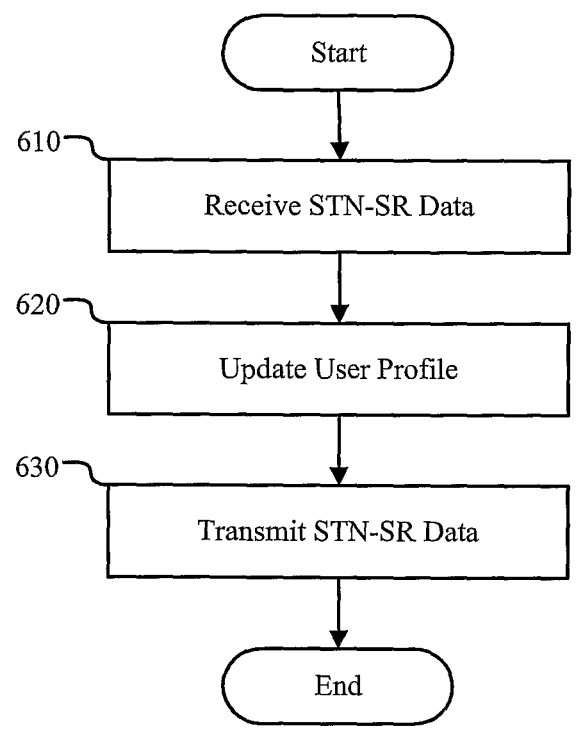
FIG. 6 depicts a flow chart diagram of a method for HSS to transmit STN-SR data in accordance with embodiments of the present invention.

FIG. 6 is a flow chart diagram of a method 600 for a mobility switching center to initiate an emergency session continuity procedure. The depicted method 600 includes receiving 610 STN-SR data, updating 620 a user profile, and transmitting 630 STN-SR data. The operations of the method 600 provide a solution for receiving STN-SR from a visited network and updating an MME with the STN-SR.

In some embodiments, receiving 610 STN-SR data may include an HSS receiving STN-SR data from an IMS that corresponds to an emergency session in a visited network. In some embodiments, the STN-SR data corresponds to a user profile stored locally on an HSS. Updating 620 a user profile may include an HSS updating a value corresponding to an STN-SR in a locally stored user profile. In some embodiments, updating 620 a user profile may trigger the transmitting 630 of STN-SR data to an MME. In some embodiments, transmitting 630 may include transmitting data and instructions for an MME to update an HSS user profile stored locally on the MME. Accordingly, the method 600 may provide a solution for providing an MME with an E-STN-SR by updating a user profile stored in the MME with an STN-SR corresponding to an emergency session in a visited network.

Figure 7:
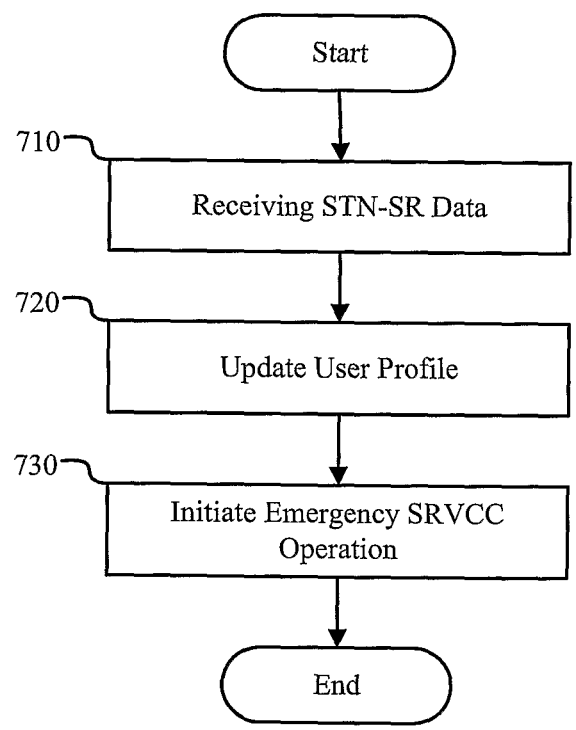
FIG. 7 depicts a flow chart diagram of a method for a MME to initiate an emergency SRVCC operation procedure in accordance with embodiments of the present invention.

FIG. 7 is a flow chart diagram of a method 700 for a mobility management entity to initiate an SRVCC operation. The depicted method 700 may include receiving 710 STN-SR data, updating 720 a user profile, and initiating 730 an emergency SRVCC operation. The operations of the method 700 provide a solution for initiating an emergency SRVCC operation using an E-STN-SR.

In some embodiments, receiving 710 STN-SR data may include an MME receiving data that may be used to point to a local IMS network that will handle an IMS emergency or an emergency SRVCC operation. In some embodiments, the STN-SR data corresponds to an HSS user profile that is stored locally on the MME. Updating 720, a user profile may include an MME updating a user profile with a non-unique or common STN-SR value.

In some embodiments, initiating 730 an emergency SRVCC operation does not directly follow the updating 702 of the user profile with the STN-SR data. In some embodiments, initiating 730 an emergency SRVCC operation may be preceded by receiving an indication of an emergency SRVCC operation from an LTE network such as an E-UTRAN network. Initiating 730 an emergency SRVCC operation may include using the STN-SR value updated by the updating 720 step and indicating to another network device, such as an MSC, that an emergency SRVCC operation should be performed. In this manner, the method 700 may provide a solution for initiating an emergency SRVCC operation using an E-STN-SR.

Figure 8:
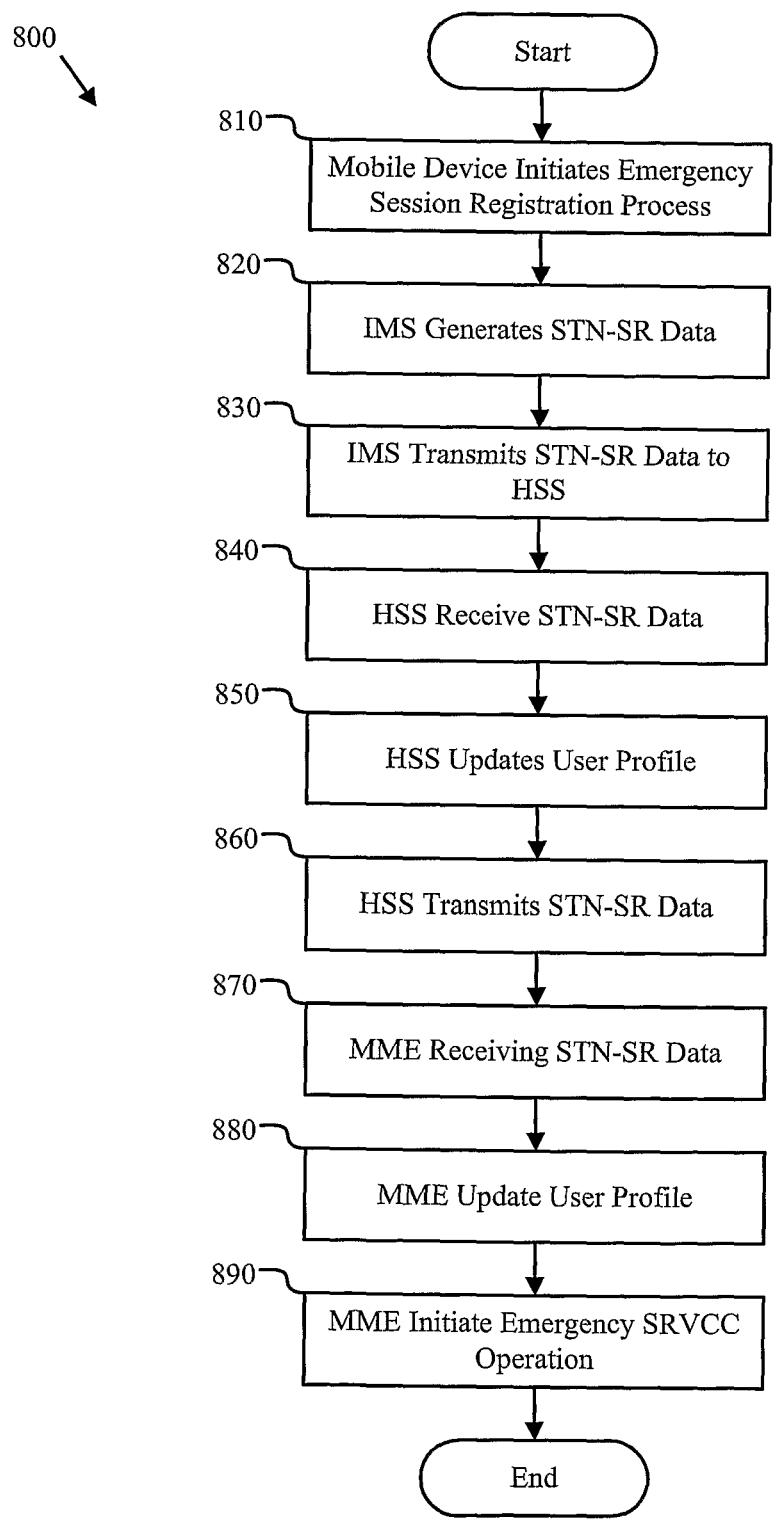
FIG. 8 depicts a flow chart diagram of a method for supporting SRVCC emergency sessions in accordance with embodiments of the present invention.

FIG. 8 is a flow chart diagram of a method 800 for supporting SRVCC emergency sessions. As represented by the depicted method 800, a user device may initiate 810 an emergency session registration process in a visited network. During the registration process, an IMS may generate 820 STN-SR data corresponding to the emergency session requested by the user device.

Upon generating the STN-SR data, the IMS may proceed by transmitting 830 the STN-SR data to the HSS of the user device. After receiving 840 the STN-SR data, the HSS may update one or more user profiles that correspond to the STN-SR data. By doing so, a session transfer number of the user device may be updated in preparation of a handover. After updating 850 user profiles, the HSS transmits 860 STN-SR data to the MME.

In some embodiments, the HSS transmitting 860 may include additional data and instructions for profile updates. Accordingly, the MME may operate to update 880 locally stored HSS user profiles upon receiving 870 the STN-SR data from the HSS. Once the locally stored HSS user profiles have been updated by the MME, the MME may be capable of initiating 890 an emergency SRVCC operation for the user device. Accordingly, the method 800 may provide a solution for supporting SRVCC emergency calls or session.

The subject matter described herein may be practiced in a different order, and/or with hardware elements in configurations which are different than those which are disclosed.

It should be noted that reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment may be included in one or more embodiments. Thus, discussion of the features and advantages, and similar language, throughout this specification may, but do not necessarily, refer to the same embodiment.

In an aspect, a method may comprise generating STN-SR data in response to a user device initiating an emergency registration process, and transmitting the STN-SR data to a home subscriber server of the user device. The generating and the communicating may be performed by an internet protocol multimedia subsystem. The STN-SR data may be transmitted by including the STN-SR data in a 3GPP-specific extensible markup language payload, wherein the generating comprises using a P-CSCF and policy and charging control mechanisms.

In another aspect, an apparatus may comprise a processor configured to generate STN-SR data in response to a user device initiating an emergency registration process, and transmit the STN-SR data to a home subscriber server of the user device. In some embodiments, the apparatus comprises an internet protocol multimedia subsystem. In some embodiments, the STN-SR data may be transmitted by including the STN-SR data in a 3GPP-specific extensible markup language payload. In some embodiments, the processor may be configured to use a P-CSCF and policy and charging control mechanisms to generate the STN-SR data.

In another aspect, a computer program embodied on a computer-readable medium and configured to control a processor to control operations is provided. The operations include generating STN-SR data in response to a user device initiating an emergency registration process, and transmitting the STN-SR data to a home subscriber server of the user device.

In another aspect, an apparatus comprises a generating means for generating STN-SR data in response to a user device initiating an emergency registration process, and a transmitting means for transmitting the STN-SR data to a home subscriber server of the user device.

In another aspect, a method comprises receiving STN-SR data corresponding to an emergency session in a visited network, updating a user profile with the STN-SR data, the user profile corresponding to the emergency session, and transmit the STN-SR data to a mobile management entity corresponding to the emergency session in the visited network.

In another aspect, the method may comprise updating a locally stored home subscriber server user profile based on the STN-SR data. In some embodiments, the method may further comprise transmitting instructions and the STN-SR data to a mobile management entity using a user profile management function configured to update a home subscriber server user profile stored in the mobile management entity. Additionally, method may further comprise a diameter command such as a home subscriber server user profile command.

In another aspect, an apparatus comprises a processor configured to receive STN-SR data corresponding to an emergency session in a visited network, update a user profile with the STN-SR data, the user profile corresponding to the emergency session, and transmit the STN-SR data to a mobile management entity corresponding to the emergency session in the visited network.

In another aspect, the processor may be configured to update a locally stored home subscriber server user profile based on the STN-SR data. In some embodiments, the processor may communicate instructions and the STN-SR data to a mobile management entity using a user profile management function configured to update a home subscriber server user profile stored in the mobile management entity. Additionally, the processor may be configured to transmit a diameter command such as a home subscriber server user profile command.

In another aspect, a computer program embodied on a computer-readable medium and configured to control a processor to control operations is provided. The operations include receiving STN-SR data corresponding to an emergency session in a visited network, updating a user profile with the STN-SR data, the user profile corresponding to the emergency session, and transmit the STN-SR data to a mobile management entity corresponding to the emergency session in the visited network.

In another aspect, an apparatus comprises receiving means for receiving STN-SR data corresponding to an emergency session in a visited network, updating means for updating a user profile with the STN-SR data, the user profile corresponding to the emergency session, and transmitting means for transmit the STN-SR data to a mobile management entity corresponding to the emergency session in the visited network.

In another aspect, a method comprises receiving STN-SR data from a home subscriber server, updating a user profile based on the STN-SR data, and initiating an emergency SRVCC procedure using the STN-SR data. In some embodiments, the initiating of the emergency SRVCC procedure is performed in response to receiving an indication from a long term evolution network that an emergency SRVCC procedure is to be performed. In some embodiments, the initiating comprises indicating to a mobile switching center that an emergency SRVCC procedure is to be performed.

In another aspect, an apparatus comprises a processor configured to receive STN-SR data from a home subscriber server, update a user profile based on the STN-SR data, and initiate an emergency SRVCC procedure using the STN-SR data. In some embodiments, the processor is configured to initiate the emergency SRVCC procedure in response to receiving an indication from a long term evolution network that an emergency SRVCC procedure is to be performed. In some embodiments, processor is configured to initiate the emergency SRVCC procedure by indicating to a mobile switching center that an emergency SRVCC procedure is to be performed.

In another aspect, a computer program embodied on a computer-readable medium and configured to control a processor to control operations is provided. The operations include receiving STN-SR data from a home subscriber server, updating a user profile based on the STN-SR data, and initiating an emergency SRVCC procedure using the STN-SR data.

In another aspect, an apparatus comprises receiving means for receiving STN-SR data from a home subscriber server, updating means for updating a user profile based on the STN-SR data, and initiating means for initiating an emergency SRVCC procedure using the STN-SR data.

In another aspect, a system comprises an internet protocol multimedia subsystem, a home subscriber server, and a mobile management entity. The internet protocol multimedia subsystem may be configured to generate STN-SR data in response to a user device initiating an emergency registration process, and transmit the STN-SR data to a home subscriber server of the user device. The home subscriber server may be configured to receive STN-SR data corresponding to an emergency session in a visited network, update a user profile with the STN-SR data, the user profile corresponding to the emergency session, and transmit the STN-SR data to a mobile management entity corresponding to the emergency session in the visited network. The mobile management entity may be configured to receive STN-SR data from a home subscriber server, update a user profile based on the STN-SR data, and initiate an emergency SRVCC procedure using the STN-SR data.

The subject matter described herein may be embodied in systems, apparatus, methods, and/or articles depending on the desired configuration. For example, the base stations and user equipments (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
  receiving, at a home subscriber server, a first message comprising a generated value representing a session transfer number from an internet protocol multimedia subsystem, the session transfer number relating to a transfer of an emergency session from a first network to a second network and pointing to the internet protocol multimedia subsystem where the transfer of the emergency session occurs;
  updating, by the home subscriber server, a user profile with the generated value representing the session transfer number for the emergency session, the user profile stored in the home subscriber server; and
  sending, by the home subscriber server, a second message comprising the generated value representing the session transfer number.

2. The method of claim 1, further comprising:
  initiating a single radio voice call continuity operation to transfer the emergency session from the first network to the second network.

3. The method of claim 1, wherein the first network is a packet switched network, and the second network is a circuit switched network.

4. The method of claim 1, wherein the generated value representing the session transfer number is an international telecommunications union E.164 address.

5. The method of claim 1, wherein the generated value representing the session transfer number identifies a service centralization continuity application server.

6. The method of claim 1, wherein the internet protocol multimedia subsystem generates the generated value.

7. The method of claim 1, wherein the first message is sent during at least one of an emergency session establishment and an emergency registration.

8. The method of claim 1, wherein the second message provides information to update a home subscriber server user profile stored in a mobility management entity.

9. An apparatus comprising:
  at least one processor; and
  at least one memory including computer program code, the at least one processor, the at least one memory, and the computer program code configured to cause the apparatus to perform at least the following:
  receive, at a home subscriber server, a first message comprising a generated value representing a session transfer number from an internet protocol multimedia subsystem, the session transfer number relating to a transfer of an emergency session from a first network to a second network and pointing to the internet protocol multimedia subsystem where the transfer of the emergency session occurs;
  update, by the home subscriber server, a user profile with the generated value representing the session transfer number for the emergency session, the user profile stored in the home subscriber server; and
  send, by the home subscriber server, a second message comprising the generated value representing the session transfer number.

10. The apparatus of claim 9, wherein the apparatus is further caused to:
  initiate a single radio voice call continuity operation to transfer the emergency session from the first network to the second network.

11. The apparatus of claim 9, wherein the first network is a packet switched network, and the second network is a circuit switched network.

12. The apparatus of claim 9, wherein the generated value representing the session transfer number is an international telecommunications union E.164 address.

13. The apparatus of claim 9, wherein the generated value representing the session transfer number identifies a service centralization continuity application server.

14. The apparatus of claim 9, wherein the internet protocol multimedia subsystem generates the generated value.

15. The apparatus of claim 9, wherein the first message is sent during at least one of an emergency session establishment and an emergency registration.

16. The apparatus of claim 9, wherein the second message provides information to update a home subscriber server user profile stored in a mobility management entity.

17. A computer program product comprising a non-transitory computer-readable medium encoded with instructions, that when executed by at least one processor, perform at least the following operations:
  receiving, at a home subscriber server, a first message comprising a generated value representing a session transfer number from an internet protocol multimedia subsystem, the session transfer number relating to a transfer of an emergency session from a first network to a second network and pointing to the internet protocol multimedia subsystem where the transfer of the emergency session occurs;
  updating, by the home subscriber server, a user profile with the generated value representing the session transfer number for the emergency session, the user profile stored in the home subscriber server; and sending, by the home subscriber server, a second message comprising the generated value representing the session transfer number.

18. The computer-readable medium of claim 17, the operations further comprising:
    initiating a single radio voice call continuity operation to transfer the emergency session from the first network to the second network.

19. The computer-readable medium of claim 17, wherein the first network is a packet switched network, and the second network is a circuit switched network.

20. The computer-readable medium of claim 17, wherein the generated value representing the session transfer number is an international telecommunications union E.164 address.

* * * * *